US008814019B2

(12) United States Patent
Dyster et al.

(10) Patent No.: US 8,814,019 B2
(45) Date of Patent: Aug. 26, 2014

(54) RECONFIGURABLE ELECTRICAL WIRED CUMBERBUND

(75) Inventors: Justin Dyster, Chandler, AZ (US);
Michael Stimpson, Gilbert, AZ (US);
Nate Patulski, Tempe, AZ (US);
Norman Lange, Chandler, AZ (US);
Chris Stalzer, Scottsdale, AZ (US)

(73) Assignee: Black Diamond Advanced Technology, LLC, Tempe, AZ (US)

( * ) Notice: Subject to any disclaimer, the term of this patent is extended or adjusted under 35 U.S.C. 154(b) by 400 days.

(21) Appl. No.: 13/190,588

(22) Filed: Jul. 26, 2011

(65) Prior Publication Data

US 2012/0042439 A1 Feb. 23, 2012

Related U.S. Application Data

(60) Provisional application No. 61/374,367, filed on Aug. 17, 2010.

(51) Int. Cl.
*A45F 3/00* (2006.01)

(52) U.S. Cl.
USPC ............ 224/660; 224/676; 224/683; 224/930

(58) Field of Classification Search
USPC ......... 224/660, 575, 576, 153, 581–583, 627, 224/645, 646, 648, 649, 655, 676, 681–683, 224/249, 240, 245, 302, 930; 2/102
See application file for complete search history.

(56) References Cited

U.S. PATENT DOCUMENTS

| | | | | |
|---|---|---|---|---|
| 1,486,470 A | * | 3/1924 | Welch | 224/683 |
| 3,274,476 A | * | 9/1966 | Wildum | 320/112 |
| 4,523,703 A | * | 6/1985 | McKenna | 224/676 |
| 4,569,465 A | * | 2/1986 | O'Farrell | 224/660 |
| 5,211,321 A | * | 5/1993 | Rodriguez | 224/604 |
| 5,724,707 A | | 3/1998 | Kirk et al. | |
| 6,243,870 B1 | | 6/2001 | Graber | |
| 6,443,347 B1 | * | 9/2002 | Elizalde et al. | 224/626 |
| 8,079,503 B1 | * | 12/2011 | Yeates et al. | 224/666 |

FOREIGN PATENT DOCUMENTS

| | | |
|---|---|---|
| DE | 202007016525 U1 | 2/2008 |
| JP | 2000357025 | 12/2000 |
| WO | 2005031684 A1 | 4/2005 |

OTHER PUBLICATIONS

International Search Report for PCT/US2011/047326 mailed Nov. 11, 2011.

* cited by examiner

*Primary Examiner* — Justin Larson
*Assistant Examiner* — Corey Skurdal
(74) *Attorney, Agent, or Firm* — Caesar, Rivise, Bernstein, Cohen & Pokotilow, Ltd.

(57) ABSTRACT

An interchangeable cumberbund with integrated wiring to allow for connecting a variety of electronic devices for an intended purpose or mission and exchanging a configured garment for another. The reconfigurable cumberbund allows for multiple quick-disconnect cable harnesses to be weaved into the cumberbund which enables rapid and convenient removal of hardware that incorporates all I/O to a computer. The reconfigurable cumberbund connected to a wearable tactical vest containing a mobile ultra-rugged personal computer is the essential combination that allows hands-free use by the user.

11 Claims, 4 Drawing Sheets

RECONFIGURABLE ELECTRICAL WIRED CUMBERBUND

CROSS-REFERENCE TO RELATED APPLICATIONS

This application claims priority from Provisional Application Ser. No. 61/374,367, filed on Aug. 17, 2010, entitled Reconfigurable Electrical Wired Cumberbund, which application is assigned to the same assignee as this application and whose disclosure is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to devices for mounting items on the body of a person and more particularly to cumberbunds arranged for receipt of electrical cables therethrough to effect the interconnection of electrical components carried on the body of the person.

BACKGROUND OF THE INVENTION

The Pouch Attachment Ladder System (PALS), is disclosed in U.S. Pat. No. 5,724,707, and constitutes a grid of webbing, e.g., rows of heavy-duty nylon, which are interwoven and stitched onto a backing to allow for the attachment of various MOLLE (Modular Lightweight Load-carrying Equipment)—compatible pouches and accessories. The PALS system has been used in a variety of equipment such as vests, plate carriers, and body armor for attaching or mounting various items or gear thereon. Typically a cumberbund is provided around the user's torso to secure the vest in place on the user.

The use of body-carried, ruggedized computer gear in the military is gaining wider and wider acceptance for battlefield activities. However, as will be readily appreciated, the electrical connection of such computer equipment to various peripherals and communication devices requires numerous cables and the like. Thus, while it is desirable to be able to mount or support the computer and such peripherals on a PALS vest or carrier, conventional cumberbunds for use with such PALS devices leave much to be desired from the standpoint of ease of use and avoidance cable entanglement. Thus, there presently exists a need for a reconfigurable, interchangeable body-mounted, hands-free operation of computer peripherals to avoid entanglement during operation in the field. The subject invention addresses that need by providing a cumberbund having features enabling rapid reconfiguring connections to peripherals and communication devices when switching between missions. Thus, the subject invention provides the user with the capability to instantly integrate electrical components, computers, or other peripherals on his/her body as a wearable system using their existing tactical vest/armor plate carrier.

All references cited are hereby specifically incorporated by reference herein.

SUMMARY OF THE INVENTION

In accordance with one aspect of the invention there is provided a cumberbund arranged to be releasably coupled to a garment, e.g., a vest. The garment, e.g., vest, is arranged for supporting a first component of a computer system, e.g., a ruggedized display screen. The cumberbund is also arranged, e.g., includes a PALS system, for supporting a second component of the computer system, e.g., the computer processor. The cumberbund includes at least one internal passageway for receipt of at least one electrical cable device arranged to electrically connect the first and second components of the computer system to each other. The cumberbund is arranged to be rapidly exchanged for a different cumberbund.

In accordance with another aspect of this invention there is provided the combination of a garment and a cumberbund, with the cumberbund being constructed as set forth immediately above.

DETAILED DESCRIPTION OF THE PREFERRED EMBODIMENT

Figure 1:
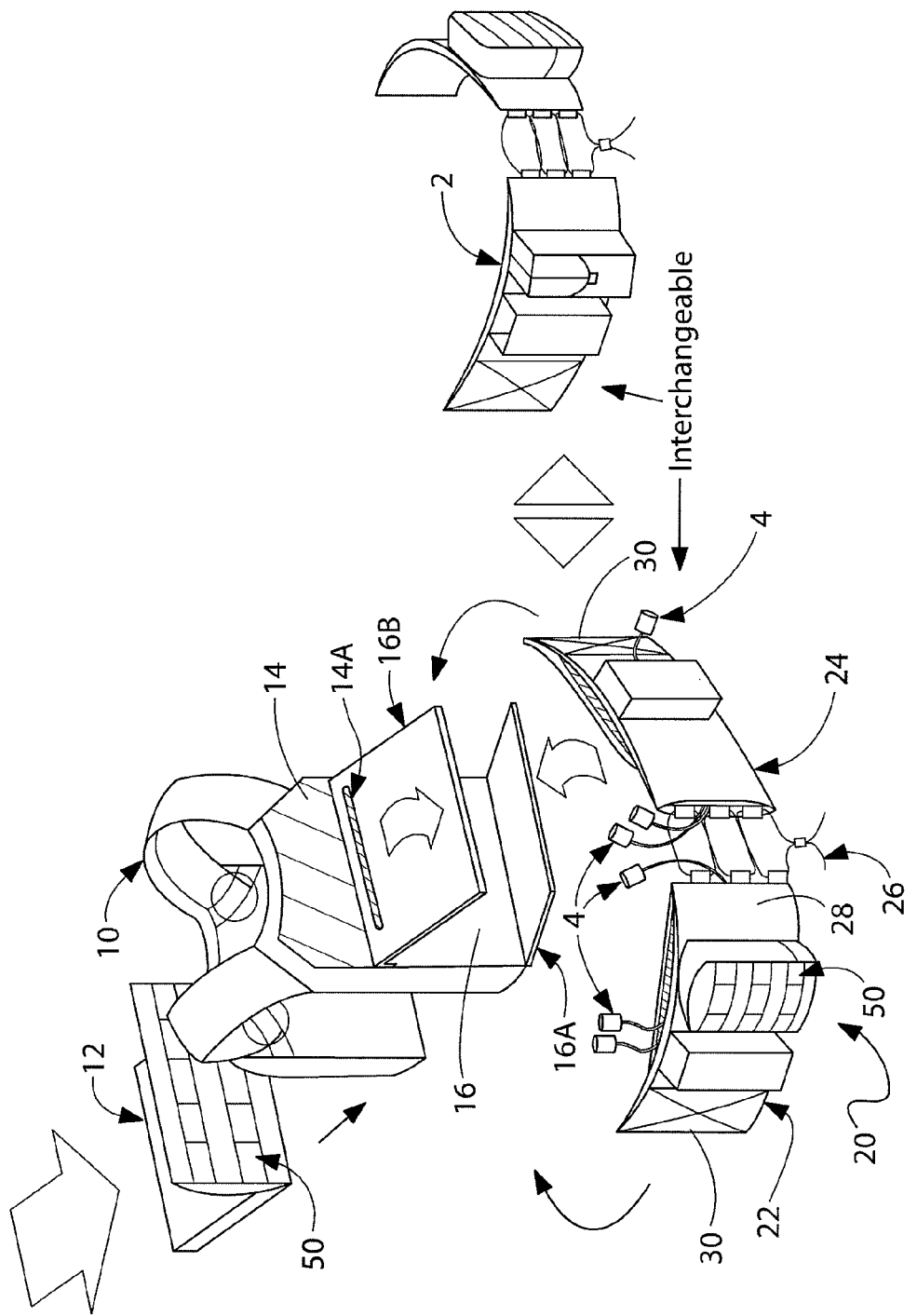
FIG. 1 is an exploded isometric view of showing a cumberbund constructed in accordance with this invention being substituted for a conventional, prior-art cumberbund, to support a conventional vest and effect the quick and easy interconnection of a computer to various peripheral equipment carried by the combination cumberbund/vest.

Referring now to the various figures of the drawing wherein like reference characters refer to like parts, there is shown in FIG. 1 at 20 a cumberbund constructed in accordance with one exemplary embodiment of this invention. The cumberbund 20 (hereinafter referred to as a wired cumberbund") is arranged to be releasably coupled to a vest 10 (or some other body-worn item, e.g., an armor carrier). The wired cumberbund 20 is arranged to used alone or to be substituted for a conventional prior-art cumberbund 2 (like shown in FIG. 3), whenever desired. The vest 10 is for illustrative purposes and is representative of various types of vests with which the subject invention can be used. The cumberbund can be used by itself, for some applications, if desired.

In the exemplary embodiment shown the vest 10 includes a Pouch Attachment Ladder System ("PALS") system for mounting Modular Lightweight Load-carrying Equipment ("MOLLE") components thereon. To that end, the vest 10 includes a MOLLE enabled front pocket 12 for carrying a ruggedized computer display panel (not shown) of a computer system (not shown). The vest 10 and cumberbund 20 together form a support system for supporting the entire computer system on the wearer. The front pocket 12 holding the display is mounted on the vest 10 in a conventional manner, e.g., via the PALS system. The rear of the vest 10 includes an internal pocket 14 in which the processor unit of the computer system is located. A slot 14A is provided for enable an electrical cable to be extended therethrough for connection to the processor unit. The rear of the vest 10 also includes an openable/closable passageway 16 formed by a pair of VELCRO equipped flaps 16A and 16B to form a cumberbund support for accommodating a portion, e.g., the central rear portion 28 of the wired cumberbund 20, to releasably secure the cumberbund and the vest to each other.

Figure 4:
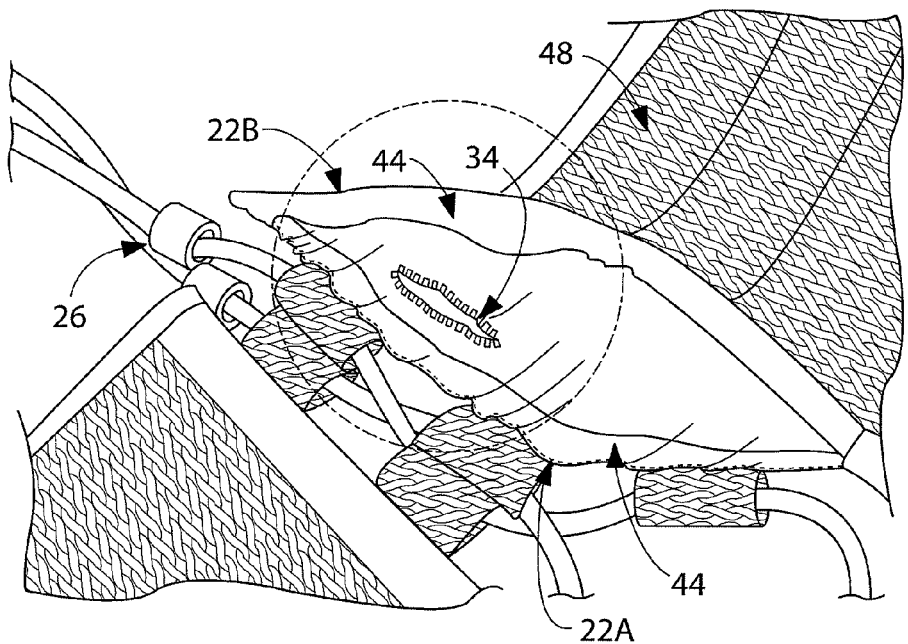
FIG. 4 is an isometric view of an inside portion of the cumberbund of this invention showing its hidden layers for routing electrical cables therethrough.
Figure 5:
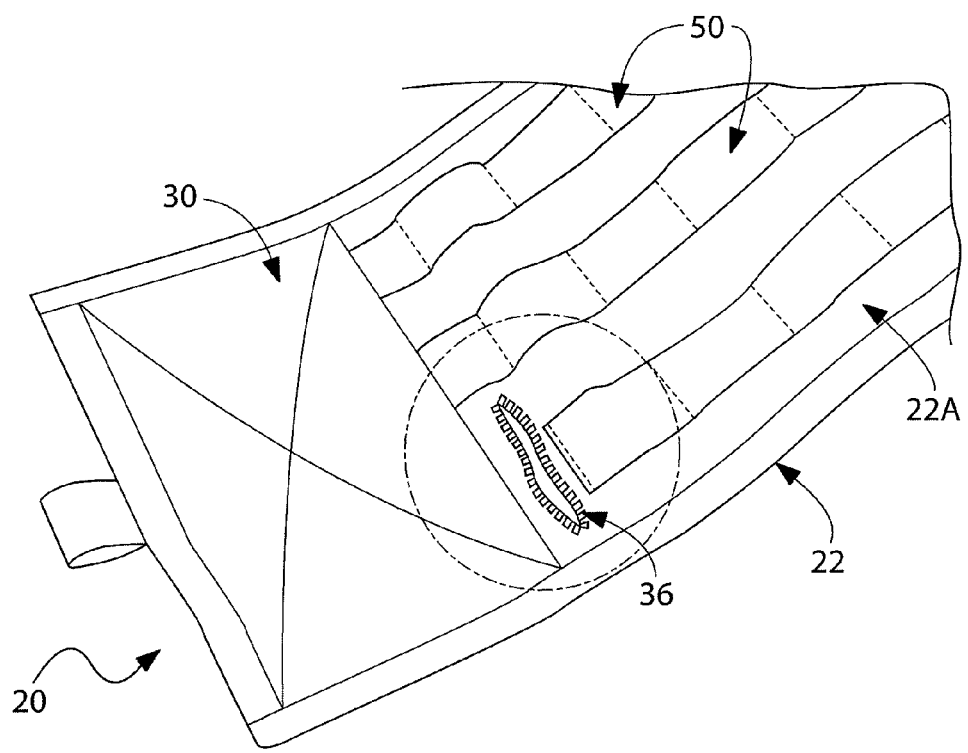
FIG. 5 is an isometric view of one end of the cumberbund of this invention showing one exit aperture through which an internally routed cable may exit for interconnection to an externally mounted peripheral.

The wired cumberbund 20 is preferably fully adjustable for height and girth and is constructed somewhat similarly to a conventional PALS type cumberbund 2, like shown in FIG. 2, except that the wired cumberbund 20 includes layers forming internal passageways (to be described later) through which various electrical cables 4/4'/4" can be threaded for interconnecting various components of the computer system and/or peripherals (e.g., communication devices) to one another without such cables becoming entangled. The common features of the prior-art cumberbund 2 and the wired cumberbund 20 will be given the same reference numbers in the interest of brevity and drawing simplicity. Many of the details of the wired cumberbund are shown in FIGS. 2, 4 and 5.

Figure 2:
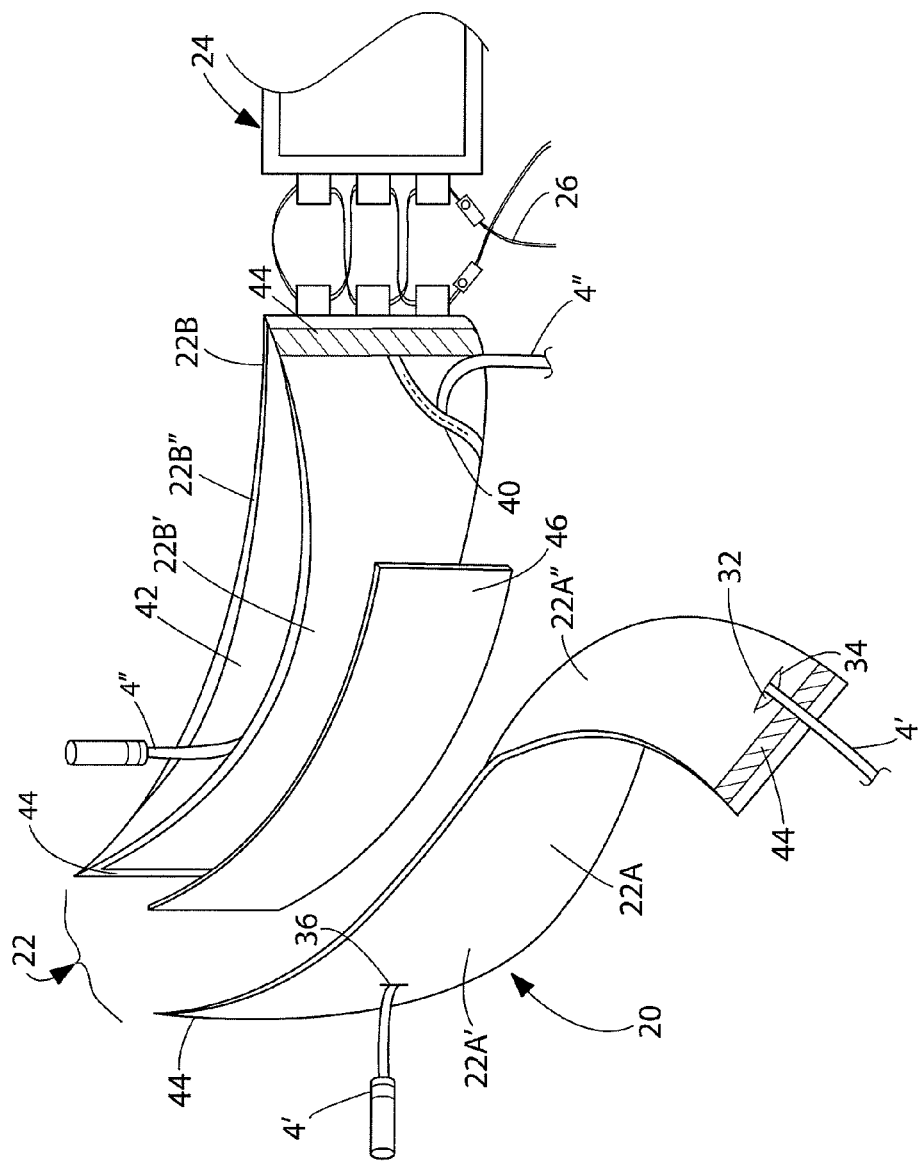
FIG. 2 is an enlarged exploded isometric view of a portion of the cumberbund of this invention shown in FIG. 1.

Thus, as best seen in FIGS. 1, 2, 4 and 5 the wired cumberbund 20 basically comprises two sections 22 and 24, which are interconnected by elastic lacing 26 at the rear 28 of the cumberbund. Each of the sections 22 and 24 basically comprises a pair of web-like members. Only two of those members, namely, 22A and 22B, forming the section 22, are shown in FIG. 2. It should be understood, that section 24 also includes a similar pair of web-like members to the members 22A and 22B, but such members are not shown in the interest of drawing simplicity. The front end portion of each of the web-like sections 22 and 24 of the cumberbund includes respective VELCRO fasteners 30 to enable the cumberbund to be releasably secured to the vest 10 or some other item.

Each of the cumberbund sections 22 and 24 comprises a pair of web-like members of similar size and shape and which are secured together. In particular, as best seen in FIG. 2, the member 22A is itself made up of a pair of fabric, e.g., nylon, layers 22A' and 22A". The layer 22A' and the layer 22A" are sewn together along their respective top, bottom and side edges to form a hollow interior compartment or passageway 32 between those layers. The entrance to the interior compartment 32 in member 22A is provided by an eyelet or button-hole opening 34 (FIGS. 2 and 4) on the inner layer 22A" of the member 22A. The exit to the interior compartment 32 is in the form of an eyelet or button-hole opening 36 in the outer layer 22A' of that member. One or more electrical cables, e.g., the exemplary cable designated as 4', can be extended through the button-holes 34 and 36 and the interior compartment 32 to facilitate connection between any electrical components carried by the cumberbund 20 and/or vest 10.

The web-like member 22B also comprises a pair of weblike layers 22B' and 22B" which are of similar size and shape, except that the inner layer 22B" is cut away at its lower corner 40. The layers 22B' and 22B" are secured together by stitching along their side and lower edges to form a hollow interior compartment or passageway 42 between those layers. The cut-away lower corner of the inner layer 22B' serves as an entrance to the compartment 42 through which another cable or plural cables, e.g., exemplary cable 4" extends. The upper edge of the compartment 42 is open along its entire length so that the other end of the cable 4" can exit from the compartment at any point along the member 22B to facilitate connection between any electrical components carried by the cumberbund 20 and/or vest 10.

Figure 3:
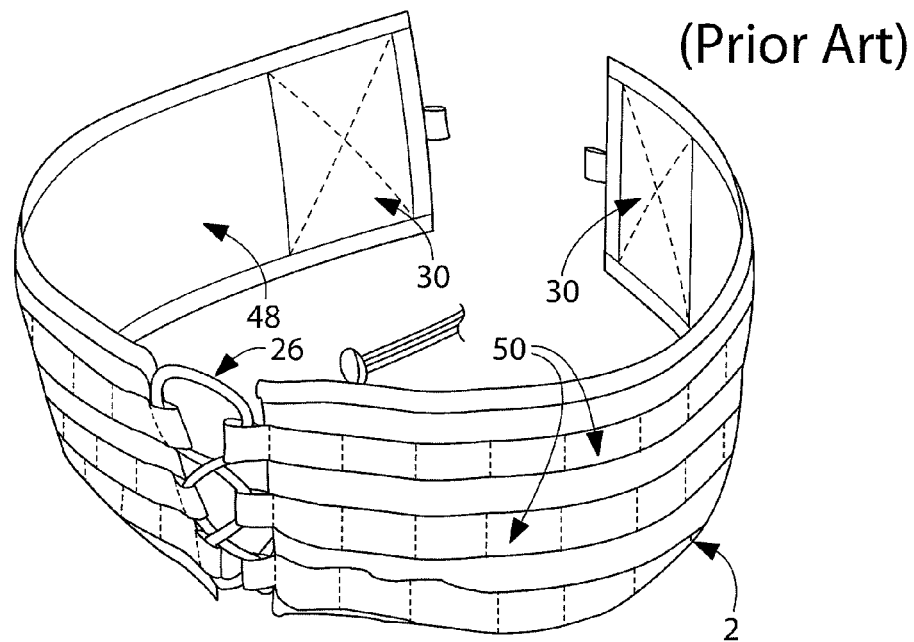
Fig. 3 is an isometric view of the prior-art cumberbund shown in FIG. 1 and for which the cumberbund of this invention is substituted.

As best seen in FIGS. 2 and 4 the two web-like members 22A and 22B of cumberbund section 22 are secured together, e.g., sewn, other along their top and bottom edges to form a space or compartment therebetween. The side edges of those members are arranged to be releasably secured together by use of cooperating VELCRO® strips 44 to seal the compartment therebetween. If desired a web of soft armor 46 may be disposed in the compartment between the members 22A and 22B, such as shown in FIG. 2. If desired, the inner surface of the layer 22B" may be covered by an optional sheet of nylon webbing 48 as best seen in FIGS. 3 and 4.

Each of the layers making up the members 22A and 22B is preferably formed of nylon fabric, but other materials may be used if desired. Moreover, various thicknesses and densities of the fabric materials may employed to obtain desired durability versus weight of the wired cumberbund 20.

As best seen in FIGS. 2 and 5 the wired cumberbund 20 includes PALS webbing 50, i.e., rows of heavy-duty nylon, that are stitched onto the outer surface, e.g., fabric layer 22A', of the wired cumberbund 20 to allow for attachment of various MOLLE-compatible pouches and accessories.

As mentioned earlier, the wired cumberbund 20 is arranged to be interchangeable with any tactical vest (e.g., vest 10) or any plate carrier that employs an existing cumberbund used to secure the garment around the user's torso. This feature allows the user to exchange his/her existing cumberbund 2 with an electrical wired cumberbund 20, thereby provides the wearer with the capability to instantly integrate electrical components, computers, or other peripherals on his/her body as a wearable system using his/her existing tactical vest/armor plate carrier.

To install the wired cumberbund 20 on a tactical vest 10, it is first populated with the necessary cables, e.g., cables 4/4'/4", and other electronic hardware (not shown) used for the intended application. Next, the existing (prior-art) cumberbund 2 is removed from the tactical vest 10 and replaced with the electronics wired cumberbund 20. The operation may be repeated in reverse (switching back to original cumberbund 2) to rapidly reconfigure the user's tactical vest for multiple missions or purposes.

As should be appreciated by those skilled in the art from the foregoing the wired cumberbund of this invention has hidden layers of flat, segregated compartments or passageways sewn into the fabric that extend the length of the device. These layers allow electrical cables or other electronics to be routed through the fabric of the cumberbund and to be completely hidden. Button holes and fabric slots or "mouths" are strategically placed for the cables to exit the cumberbund. These passageways or compartments are designed to integrate cables and other electronic components, which can be configured based upon the end user's preference. By hiding (covering) the cables and electronics within the cumberbund, the total electronics system reliability is greatly increased by reducing wear and snag-hazards. Moreover, the wired cumberbund allows the user to connect essential electronic equipment or computer peripherals to a cumberbund that is connected to a wearable tactical vest containing a computer, e.g., a mobile ultra-rugged personal computer, for ease of motion in the field. Multiple configurations may be exchanged rapidly by a user in such fields as public safety or military when the mission profile requires different objectives and thus a different configuration of electronic equipment or computer peripherals.

Without further elaboration the foregoing will so fully illustrate our invention that others may, by applying current or future knowledge, adopt the same for use under various conditions of service.

We claim:

1. A cumberbund arranged to be releasably coupled to a garment, the garment being arranged for supporting a first component of a computer system thereon, the cumberbund or the garment being arranged for supporting a second component of the computer system thereon, said cumberbund comprising
   a first section, said first section comprising first and second web-like members of a similar size and shape and juxtaposed one over the other,
   each of said first and second web like members comprising a pair of layers secured together to form a respective hollow internal passageway therebetween,
   each of said layers of said first web-like member having an opening therein which is in communication with said passageway between said layers of said first web-like member,
   one of said layers of said second web-like member having an opening therein comprising a cut-away lower corner which is in communication with said passageway between said layers of said second web-like member,
   each of said internal passageways of said first and second web-like members being arranged for receipt of at least one electrical cable,
   said at least one electrical cable being arranged to electrically connect the first and second components of the computer system, said cumberbund being arranged to be rapidly exchanged for a different cumberbund
   wherein each of said pair of layers of said second web-like member comprise side edges, upper edges and lower edges, and wherein said layers of said second web-like member are secured together by stitching along their respective side and lower edges to form said internal passageway of said second web-like member
   wherein said internal passageway of said second web-like member has an upper edge formed by said upper edges of said pair of layers of said second web-like member and wherein said upper edge of said internal passageway of said second web-like member is open along its entire length for at least one electrical cable.

2. The cumberbund of claim 1 wherein a layer said first web-like member includes an outer surface, wherein a layer of said second web-like member includes an inner surface, and wherein said outer surface includes a grid of webbing interwoven and stitched onto a said outer surface for enabling the attachment of various pouches and accessories thereto.

3. The cumberbund of claim 2 wherein said inner surface comprises webbing.

4. The cumberbund of claim 1 wherein said cumberbund comprises a second section constructed substantially the same as said first section and connected to said first section, said cumberbund being adjustable for height and girth.

5. The cumberbund of claim 1 wherein said cumberbund is arranged to be interchangeable with any tactical vest or any plate carrier that employs a cumberbund to secure the garment around the user's torso.

6. In combination a cumberbund and a garment arranged to be releasably coupled to each other, said garment being arranged for supporting a first component of a computer system thereon, said cumberbund or said garment being arranged for supporting a second component of the computer system thereon, said cumberbund comprising a first section, said first section comprising first and second web-like members of a similar size and shape and juxtaposed one over the other, each of said first and second web like members comprising a pair of layers secured together to form a respective hollow internal passageway therebetween, each of said layers of said first web-like member having an opening therein which is in communication with said passageway between said layers of said first web-like member, one of said layers of said second web-like member having an opening therein which is in communication with said passageway between said layers of said second web-like member, each of said internal passageways of said first and second web-like members being arranged for receipt of at least one electrical cable, said at least one electrical cable being arranged to electrically connect the first and second components of the computer system, said cumberbund being arranged to be rapidly exchanged for a different cumberbund
   wherein said garment includes an openable/closable passageway for releasable receipt of a portion of said cumberbund therein to releasably secure said garment and cumberbund together.

7. The combination of claim 6 wherein said first web-like member includes an outer surface, wherein a layer of said second web-like member includes an inner surface, and wherein said outer surface includes a grid of webbing interwoven and stitched onto a said outer surface for enabling the attachment of various compatible pouches and accessories thereto.

8. The combination of claim 7 wherein said inner surface comprises webbing.

9. The combination of claim 6 wherein said cumberbund comprises a second section constructed substantially the same as said first section and connected to said first section, said cumberbund being adjustable for height and girth.

10. The combination of claim 6 wherein said garment is a vest.

11. In combination a cumberbund and a garment arranged to be releasably coupled to each other, said garment being arranged for supporting a first component of a computer system thereon, said cumberbund or said garment being arranged for supporting a second component of the computer system thereon, said cumberbund comprising
    a first section,
    said first section comprising first and second web-like members of a similar size and shape and juxtaposed one over the other,
    each of said first and second web like members comprising a pair of layers secured together to form a respective hollow internal passageway therebetween,
    each of said layers of said first web-like member having an opening therein which is in communication with said passageway between said layers of said first web-like member,
    one of said layers of said second web-like member having an opening therein comprising a cut-away lower corner which is in communication with said passageway between said layers of said second web-like member,
    each of said internal passageways of said first and second web-like members being arranged for receipt of at least one electrical cable,
    said at least one electrical cable being arranged to electrically connect the first and second components of the computer system, said cumberbund being arranged to be rapidly exchanged for a different cumberbund
    wherein each of said pair of layers of said second web-like member comprise side edges, upper edges and lower edges, and
    wherein said layers of said second web-like member are secured together by stitching along their respective side and lower edges to form said internal passageway of said second web-like member;

wherein said internal passageway of said second web like member has an upper edge formed by said upper edges of said first and second layers of said second web-like member and wherein said upper edge of said internal passageway of said second web-like member is open along its entire length for the at least one electrical cable.

\* \* \* \* \*